United States Patent [19]

Dietl et al.

[11] 3,867,408
[45] Feb. 18, 1975

[54] 1,2-EPOXY-2-METHYL-6-HEPTANONE KETALS

[75] Inventors: Hans K. Dietl; Kent C. Brannock, both of Kingsport, Tenn.

[73] Assignee: Eastman Kodak Company, Rochester, N.Y.

[22] Filed: Aug. 23, 1972

[21] Appl. No.: 283,111

[52] U.S. Cl............ 260/340.9, 260/338, 260/340.7, 260/348 R, 424/278
[51] Int. Cl.............................................. C07d 13/04
[58] Field of Search.......... 260/340.9, 348 R, 340.7, 260/338

[56] References Cited
UNITED STATES PATENTS

| 3,117,982 | 1/1964 | Barton | 260/348 R |
| 3,136,788 | 6/1964 | Payne et al. | 260/348 R |

*Primary Examiner*—Donald G. Daus
*Assistant Examiner*—James H. Turnipseed
*Attorney, Agent, or Firm*—John F. Stevens; Cecil D. Quillen, Jr.

[57] ABSTRACT

1,2-Epoxy-2-methyl-6-heptanone ketals, intermediates in the synthesis of isophytol.

5 Claims, No Drawings

1,2-EPOXY-2-METHYL-6-HEPTANONE KETALS

This invention relates to 1,2-epoxy-2-methyl-6-heptanone ketals which are intermediates in a process for the manufacture of isophytol.

In the synthesis of dl-tocopherols, isophytol is reacted with trimethyl hydroquinone or dimethyl hydroquinone under acid conditions to form the desired product. See U.S. Pat. No. 2,411,969 of Karrer. Isophytol has also been found useful in the synthesis of vitamin K. Isophytol has been prepared by reacting 2-methyl-6-keto-heptanal with geranyl halide in a Wittig reaction, the resulting product hydrogenated to phytone which is reacted with a vinyl Grignard reagent in water to produce isophytol. See Ichikawa and Kato, Bulletin of Chemical Society of Japan 41, 1232 (1968).

In this reaction the key starting material is 2-methyl-6-ketoheptanal.

It has been found that 6-oxo-2-methylheptanal ketals are simpler to use in the Wittig reaction than 2-methyl-6-keto-heptanal since the keto group is protected as the ketal. This leaves only the aldehyde group to react in the Wittig reaction.

1,2-Epoxy-2-methyl-6-heptanone ketals in accordance with this invention are intermediates in a process for producing 6-oxo-2-methylheptanal ketals.

In the above compounds the ketal is selected from the groups alkyl, substituted or unsubstituted cycloalkyl, aryl, alkylene or substituted alkylene. The substituents may be lower alkyl, aryl or cycloalkyl groups.

By alkyl is meant any aliphatic hydrocarbon radical derived by dropping one hydrogen from an alkane and having from 1 to 10 carbon atoms. Alkylene means any aliphatic hydrocarbon radical derived by dropping two hydrogens from an alkane and having from 2 to 4 carbon atoms and lower alkyl substituted alkylene means any alkylene as defined above having 2 to 4 carbon atoms any of which may have a lower alkyl substituent. A cycloalkyl is a substituted or unsubstituted 5–7 carbon ring structive hydrocarbon. By lower alkyl is meant a hydrocarbon having from 1 to 5 carbon atoms. Aryl means a molecule having an aromatic nucleus at least one carbon of which has a lower alkyl substituent.

This compound can also be defined with reference to the following structural formula:

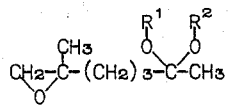

wherein $R^1$ and $R^2$ are either the same or different alkyl, cycloalkyl or aryl groups having 1 to 10 carbon atoms or $R^1$ and $R^2$ taken together are —A— wherein —A— is an alkylene group having 2 to 4 carbon atoms, or —A— is a lower alkyl (1 to 5 carbon atoms), aryl or cycloalkyl substituted alkylene group having 2 to 4 carbon atoms. The ring formed when $R^1$ and $R^2$ are —A— has no more than seven members.

In preparing 1,2-epoxy-2-methyl-6-heptanone alkyl ketal, 2-methyl-1-hepten-6-one prepared from isobutylene, acetone and formaldehyde described in British Pat. No. 1,178,036 is reacted with an aliphatic alcohol having from 1 to 10 carbon atoms or a mixture of such alcohols. The product of this reaction is 2-methyl-1-hepten-6-one alkyl ketal which is then epoxidized by reaction with a peracid or peroxide. The resulting product is 1,2-epoxy-2-methyl-6-heptanone alkyl ketal.

Suitable alcohols which can be utilized in this reaction include methanol, ethanol, n-propyl alcohol, isopropyl alcohol, n-butyl alcohol, sec-butyl alcohol, and other aliphatic alcohols up to and including decanol. These include also lower alkyl substituted aliphatic alcohols.

The compound 1,2-epoxy-2-methyl-6-heptanone alkyl ketal can also be prepared by reaction with ethyl orthoformate as described in Fieser and Fieser, *Advanced Organic Chemistry* (New York, 1961) p. 442.

1,2-Epoxy-2-methyl-6-heptanone aryl ketal is prepared as described above except the alcohol or mixture of alcohols used include a ring compound having a lower alkyl substituent. Examples of such alcohols include benzyl alcohol, α-ethylbenzyl alcohol, ω-ethylbenzyl alcohol, and benzylpropyl alcohol.

1,2-Epoxy-2-methyl-6-heptanone cycloalkyl ketal is produced in the manner described above but utilizing a cyclo-alcohol such as cyclohexanol, cyclopentanol, cycloheptanol and these alcohols with alkyl substituents.

Mixtures of alkyl, aryl and cycloalkyl alcohols may also be used. The resulting compound can be an alkyl-aryl ketal and/or an alkyl-cycloalkyl ketal and/or an aryl-cycloalkyl ketal.

In forming the epoxide suitable peracids include perbenzoic, monoperphthalic, perpropionic, perbutyric, permonochloracetic, peracetic performic, perisovaleric, percrotonic, diperoxalic, percamphoric, trifluoroperacetic, p-nitroperbenzoic, m-chloroperbenzoic acids. Epoxidation can also be achieved by the use of hydrogen peroxide.

1,2-Epoxy-2-methyl-6-heptanone cyclic alkylene or lower alkyl substituted cyclic alkylene ketal is produced by reacting 2-methyl-1-hepten-6-one with a diol having from 2 to 4 carbon atoms or with a lower alkyl substituted diol having from 2 to 4 carbon atoms. The compound produced as a result of this reaction is 2-methyl-1-hepten-6-one cyclic alkylene or lower alkyl substituted cyclic alkylene ketal. This compound is reacted with a peracid or peroxide as described above. The resulting product is 1,2-epoxy-2-methyl-6-heptanone cyclic alkylene or lower alkyl substituted cyclic alkylene ketal.

Suitable glycols include ethylene glycol, 1,2-propylene glycol, 1,3-propylene glycol, 1,2-propylene glycol, 1,3-propylene glycol, 1,4-butylene glycol, and 2,3-butylene glycol and these glycols with lower alkyl, aryl or cycloalkyl substituents. Suitable peracids and peroxides are given above.

The formation of a ketal by the reaction of a ketone and an alcohol is known. See, for example, Fieser and Fieser, *op. cit.*, pp. 441–443. The epoxidation of a compound at a double bond utilizing a peracid or a peroxide is also known. See Weissberger, *Heterocyclic Compounds*. Part 1 (New York, 1964) pp. 31–93.

The following examples are presented for a further understanding of the invention.

EXAMPLE 1

2-Methyl-1-hepten-6-one prepared from isobutylene, acetone and formaldehyde in accordance with British Pat. No. 1,178,036 (200 g.), ethylene glycol (400 g.), benzene (1,500 ml.) and p-toluenesulfonic acid (0.03 g.) is heated to reflux with vigorous stirring. Water (24 ml.) is collected in a Dean-Stark trap over a period of 7 hours. The reaction mixture is poured into 1,500 ml.

water, the water layer washed with 200 ml. benzene, the organic layers combined, dried over $MgSO_4$ and filtered. Distillation of the resulting filtered product gives 2-methyl-1-hepten-6-one ethylene ketal (204 g. corresponding to a 78% yield) at 80°–86°C., 110 mm. The 2-methyl-1-hepten-6-one ethylene ketal (200 g.) is dissolved in methylene chloride (800 ml.), sodium acetate (65 g.) is added, and the mixture cooled to 0°C. Peracetic acid (40%, 240 g.) containing sodium acetate (8 g.) is added with stirring over a period of 1 hour. The reaction mixture is allowed to warm to room temperature over a period of 4 hours, stirred for one hour at room temperature, and then poured into water. The organic layer is separated, dried over $MgSO_4$ and filtered. Distillation gives 1,2-epoxy-2-methyl-6-heptanone cyclic ethylene ketal (179 g., corresponding to a yield of 90%), having a boiling point of 76°–78°C. at 1 mm.

EXAMPLE 2

The exact procedure of Example 1 is repeated except one mole of m-chloroperbenzoic acid per mole of 2-methyl-1-hepten-6-one ethylene ketal is used instead of peracetic acid and no sodium acetate is utilized. The yield is 90%.

EXAMPLE 3

The exact procedure of Example 1 is repeated except 1,2-propanediol is used instead of ethylene glycol. Distillation gives 1,2-epoxy-2-methyl-6-heptanone cyclic methylethylene ketal at a yield of 90%.

EXAMPLE 4

The exact procedure of Example 1 is repeated except n-propyl alcohol is used instead of ethylene glycol. Distillation gives 1,2-epoxy-2-methyl-6-heptanone dipropyl ketal at a yield of 90%.

EXAMPLE 5

The exact procedure of Example 1 is repeated except benzyl alcohol is used instead of ethylene glycol. Distillation gives 1,2-epoxy-2-methyl-6-heptanone dibenzyl ketal.

EXAMPLE 6

The exact procedure of Example 1 is repeated except cyclohexanol is used instead of ethylene glycol. Distillation gives 1,2-epoxy-2-methyl-6-heptanone dicyclohexyl ketal.

EXAMPLE 7

The exact procedure of Example 1 is repeated except a mixture of n-propyl alcohol with n-butyl alcohol is used instead of ethylene glycol. Distillation gives a mixture of 1,2-epoxy-2-methyl-6-heptanone propyl ketal; 1,2-epoxy-2-methyl-6-heptanone propyl butyl ketal, and 1,2-epoxy-2-methyl-6-heptanone butyl ketal.

Disclosed herein are new compounds, 1,2-epoxy-2-methyl-6-heptanone ketals including alkyl, aryl, cyclic alkylene, lower alkyl substituted cyclic or cycloalkyl alkylene ketals. These compounds are valuable intermediates in the production of phytol and isophytol which are reactants in the synthesis of dl-tocopherols, i.e., Vitamin E.

The invention has been described in detail with particular reference to preferred embodiments thereof, but it will be understood that variations and modifications can be effected within the spirit and scope of the invention.

I claim:

1. A ketal having the formula

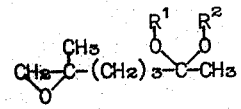

wherein
$R^1$ and $R^2$ are the same or different alkyl having 1 to 10 carbon atoms, cycloalkyl having 5 to 7 carbon ring structure or phenyl one carbon atom of which has an alkyl having 1 to 5 carbon atoms; or
$R^1$ and $R^2$ taken together are —A— wherein —A— is alkylene having 2 to 4 carbon atoms or alkylene having 2 to 4 carbon atoms substituted with alkyl having 1 to 5 carbon atoms, cycloalkyl having a 5–7 carbon ring structure or phenyl one carbon of which is substituted with alkyl having 1 to 5 carbon atoms.

2. A ketal according to claim 1 wherein $R^1$ and $R^2$ are —A— and the ring formed thereby has no more than 7 members.

3. 1,2-Epoxy-2-methyl-6-heptanone cyclic ethylene ketal having the formula

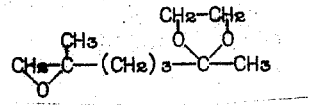

4. 1,2-Epoxy-2-methyl-6-heptanone cyclic methylethylene ketal.

5. 1,2-Epoxy-2-methyl-6-heptanone dipropyl ketal.

* * * * *